(12) United States Patent
Bulmahn et al.

(10) Patent No.: US 11,684,007 B2
(45) Date of Patent: Jun. 27, 2023

(54) PNEUMATIC SINGLE-GRAIN SOWING MACHINE

(71) Applicant: Amazonen-Werke H. Dreyer GmbH & Co. KG, Hasbergen (DE)

(72) Inventors: Simon Bulmahn, Westerstede (DE); Thomas Wien, Stuhr (DE)

(73) Assignee: AMAZONEN-WERKE H. DREYER SE & CO. KG

( * ) Notice: Subject to any disclaimer, the term of this patent is extended or adjusted under 35 U.S.C. 154(b) by 436 days.

(21) Appl. No.: 16/955,184

(22) PCT Filed: Dec. 10, 2018

(86) PCT No.: PCT/EP2018/084101
§ 371 (c)(1),
(2) Date: Jun. 18, 2020

(87) PCT Pub. No.: WO2019/121085
PCT Pub. Date: Jun. 27, 2019

(65) Prior Publication Data
US 2020/0315085 A1    Oct. 8, 2020

(30) Foreign Application Priority Data
Dec. 20, 2017   (DE) ...................... 10 2017 130 709.5

(51) Int. Cl.
A01C 19/02   (2006.01)
A01C 7/04    (2006.01)
A01C 7/20    (2006.01)

(52) U.S. Cl.
CPC .............. *A01C 19/02* (2013.01); *A01C 7/046* (2013.01); *A01C 7/20* (2013.01)

(58) Field of Classification Search
CPC ........... A01C 19/02; A01C 7/046; A01C 7/20; A01C 19/00; A01C 7/044; A01C 7/042; A01C 7/04; A01C 7/00
See application file for complete search history.

(56) References Cited

U.S. PATENT DOCUMENTS 5,170,909 A    12/1992  Lundie et al.

FOREIGN PATENT DOCUMENTS

| EP | 2 923 543 A1 | 9/2015 |
| EP | 2 923 544 A1 | 9/2015 |
| GB | 1 436 008 A | 5/1976 |

OTHER PUBLICATIONS

International Search Report dated Mar. 14, 2019 in corresponding PCT Patent Application No. PCT/EP2018/084101.

*Primary Examiner* — Christopher J. Novosad
(74) *Attorney, Agent, or Firm* — Mintz, Levin, Cohn, Ferris, Glovsky and Popeo, P.C.

(57) ABSTRACT

A pneumatic single-grain sowing machine includes: a closed housing; a rotatably driven separating device, which has circularly arranged perforations; and a fan for producing a pressure difference between the housing and the interior of the separating device, the separating device thus being designed to separate seed by use of the perforations with the aid of the pressure difference, the separating device being designed as a closed hollow drum having two side walls arranged at a distance from each other. The separating device is designed to compensate slight housing expansions.

8 Claims, 4 Drawing Sheets

PNEUMATIC SINGLE-GRAIN SOWING MACHINE

Figure 1:
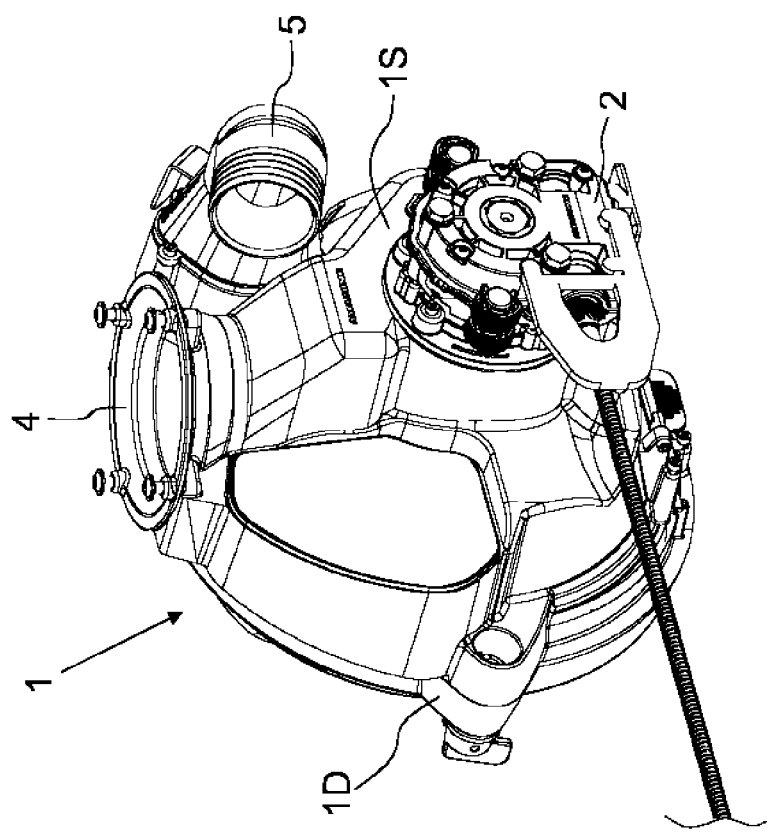

The invention refers to a pneumatic single-grain sowing machine according to the preamble of patent claim 1.

Such a pneumatic single-grain sowing machine is described in EP 2 923 543 A1. This pneumatic single-grain sowing machine is provided with a plurality of separating devices. A separating device comprises a closed housing and at its upper end a seed storage container. The separating device is arranged in the housing and is rotatably driven and is used to feed the seed conveyed from the seed storage container individually to a dispensing line. For this purpose, the pneumatic single-grain sowing machine is provided with a fan, the separating device being designed as a closed hollow drum and one of two spaced-apart side walls comprising circularly arranged perforations. The otherwise closed housing is connected to the fan and thus subjected to an overpressure so that a pressure difference is formed between the housing and the interior of the separating device. The pressure difference ensures that ideally one seed grain per perforation adheres to the side wall of the separating device. The seed thus separated is then discharged into a dispensing line by briefly interrupting the pressure difference by means of a hole covering element.

The housing substantially consists of two firmly connected parts. A first part serves to accommodate the drive means for the eccentric drive of the separating device via a gear rim, the dispensing line and the connections to the seed storage container and the fan. The second part serves to support the separating device. The disadvantage here is that if the housing is pressurized and the housing expands slightly under the pressure, the two parts of the housing shift against each other. The fact that the separating device is supported in the one part and its drive and the dispensing line are accommodated in the other part results in a disadvantageous displacement against each other. It is particularly disadvantageous that the distance between the side wall with the perforations and the dispensing line changes as a result. The supply of the separated seed into the dispensing line is thereby worsened, which in turn may be the cause for misses or doubles. A further disadvantage is that the distance between the separating device and its drive changes due to the displacement described above. In summary, the separating device in particular must be designed with tight manufacturing tolerances so that the effect of the displacement is not increased in a further disadvantageous way. This is due to the fact that there is no possibility of compensating for a displacement and a slight expansion cannot be completely prevented.

It is therefore the object of the invention to create a separating device which is configured to compensate for slight housing expansions.

According to the invention, the object is achieved in that a drive shaft is guided through at least one of said side walls, that the hollow drum is sealed against the drive shaft by means of a sealing element, that the hollow drum can be designed to be divisible by a dividing plane, that the hollow drum is formed by a rotary plate and a perforated disk having the perforations, that the dividing plane lies between the rotary plate and the perforated disk and is sealed by a seal in the undivided state, that, after the interruption of the pressure difference, the separated seed is accelerated by the pressure difference in the dispensing line.

As a result of this measure, the distance between the perforated disk and the dispensing line remains at least approximately constant, with the expansion of the housing being substantially compensated by the dividing plane of the hollow drum. In an advantageous way the dividing plane is kept tight by the seal, so that the separating device works in an improved way. Another advantage is that the drive shaft is guided directly into the hollow drum. This means that the gear rim on the separating device can be omitted and the housing can be made more compact.

In an advantageous development, it is provided that the housing is formed by a stationary housing part and a removable cover, wherein the rotary plate is supported in the cover by means of a bearing and the drive shaft is supported in the stationary housing part by means of a bearing, and that the drive shaft is guided through the perforated disk and the perforated disk can be driven in this way. In a particularly advantageous development, the hollow drum can be separated by removing the cover. The arrangement designed in this way is configured in an advantageous way to compensate for housing expansion, since the components suitable for compensating for displacement are arranged on the housing parts between which the displacement occurs. A further advantage is that components arranged in the hollow drum are accessible in a particularly convenient way by removing the cover of the separating device. This is particularly useful for the quick and easy performance of maintenance work. Another positive feature is that the housing of the separating device can be opened while it is at least partially filled with seed. Due to the arrangement of the perforated disk in the stationary part of the housing, the seed to be separated is retained by the perforated disk in the stationary part and the housing does not necessarily have to be emptied before it is opened.

In a further advantageous development, the distance of the perforated disk to the stationary housing part is adjustable. This development is characterized by the fact that the perforated disk moves almost not relative to the dispensing line, but among other things this distance is equally adjustable. As a result of this measure the supply of the separated seed from the separating device to the dispensing line is improved. This development provides that the distance is adjustable between 0 and 6 mm, preferably between 0 and 4 mm, especially preferably between 0 and 2 mm. In a further advantageous way this adjustment allows the manufacturing tolerances of the linked components to be compensated.

In order to drive the rotary plate synchronously with the perforated disk so that no additional friction is generated in the dividing plane sealed by the seal, it is provided that the seal is arranged on the rotary plate, that the seal forms a frictional coupling between the rotary plate and the perforated disk. In an advantageous way, the resulting friction is limited to the bearing of the moved components in his development. This means that a particularly low drive torque is required to drive the hollow drum.

In another particularly advantageous development, it is provided that the seal is configured to seal a gap between rotary drum and perforated disk in the axial direction of the rotary drum. This distance can be 0 to 50 mm, preferably 0 to 40 mm, especially preferably 0 to 30 mm. This type of seal can compensate for displacements, e.g. due to housing expansion, and other manufacturing tolerances in a particularly simple and expedient manner. In addition, the mounting of the rotary plate in the cover does not have to be coordinated with the mounting of the perforated disk in the stationary housing part, which perforated disk interacts with the rotary plate. This facilitates mounting and simplifies the arrangement of the two components in relation to each other.

In an equally advantageous development of the pneumatic single-grain sowing machine, it is provided that the housing comprises a drive which is configured to drive the drive shaft, wherein the drive is electrically or mechanically designed and the electric drive and the mechanical drive are interchangeable. As a result of this measure the housing of the separating device is suitable to use the drive form appropriate for the application without any complex modifications. The drive of the separating device is thus improved in an appropriate manner.

In an additional development in which the pneumatic single-grain machine comprises a hole covering element rotating about its own central axis, with this hole covering element rolling on the perforations of the perforated disk, it is provided that the hole covering element is supported in a stationary, rotatable manner by a supporting arm rigidly connected to the cover, that the central axis of the hole covering element encloses an angle of more than 5 degrees with the perforated disk. As a result of this measure, the hole covering element can be installed in a particularly simple manner and/or exchanged, for example for maintenance purposes, by opening the removable cover. A further advantage is that the arrangement at an angle of more than 5 degrees allows the different path speeds to be compensated particularly successfully when rolling on the perforated disk. This reduces wear on the hole covering element and thus contributes to a longer service life of the separating device as a whole.

Figure 2:
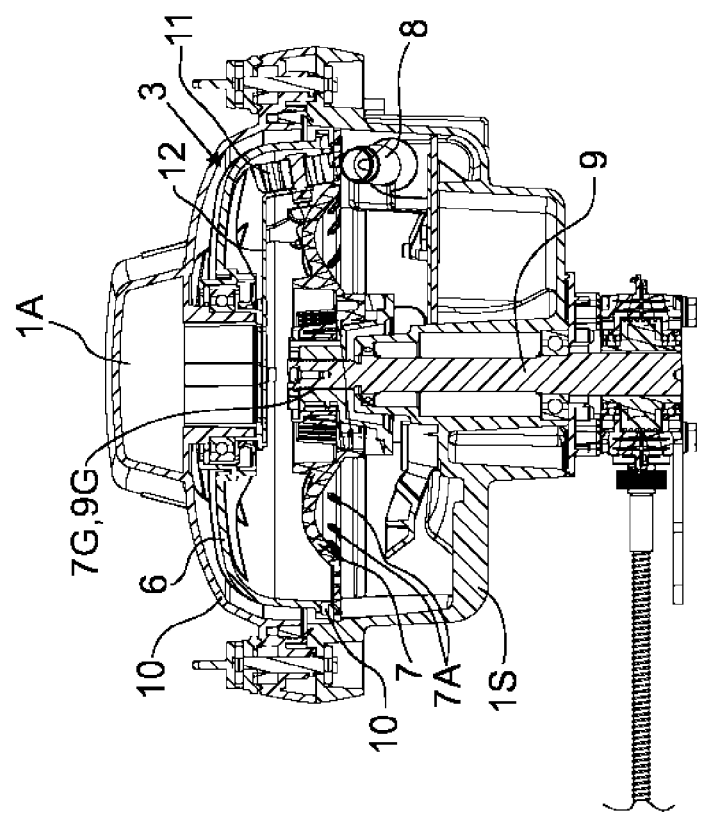
Figure 3:
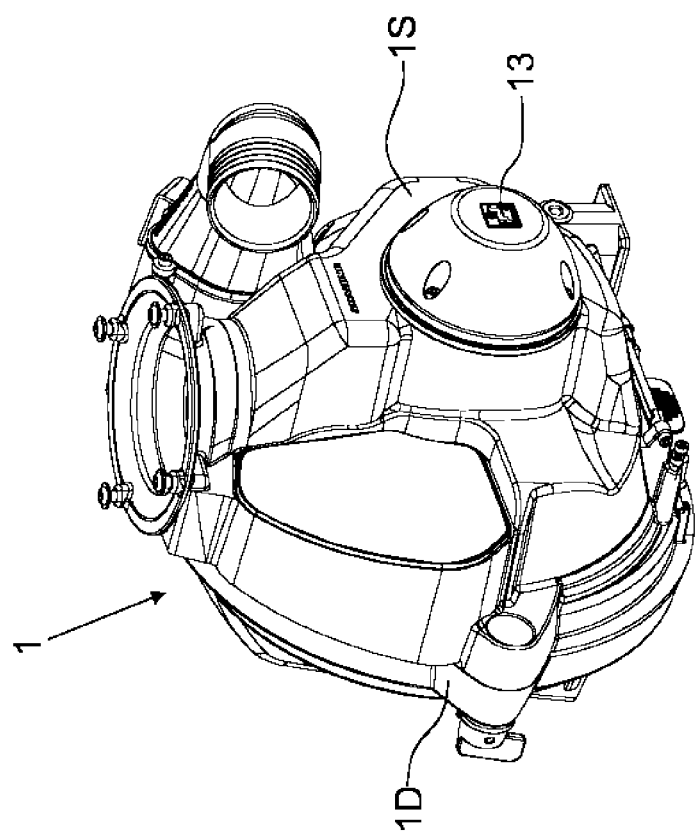
Figure 4:
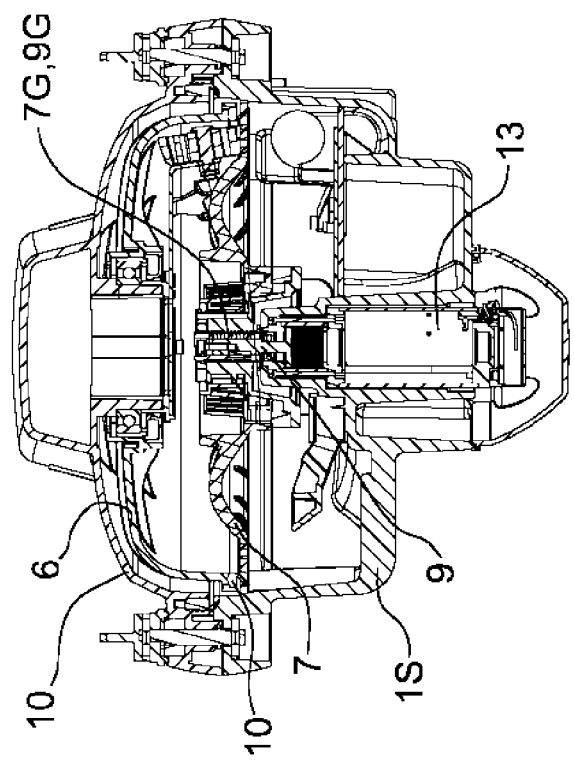

Further details of the invention can be inferred from the example description and the drawings. The drawings show:

FIG. 1 a first embodiment of a housing according to the invention of a separating device with mechanical drive in a perspective view, FIG. 2 the housing according to FIG. 1 in a sectional view, FIG. 3 a second embodiment of a housing with electric drive in a perspective view, and FIG. 4 the housing according to FIG. 3 in a sectional view.

A first embodiment of a closed housing 1 is shown in FIG. 1. The housing 1 is formed by a stationary housing part 1S and a removable cover 1D and is provided with a mechanical drive 2 at its front side. A separating device 3 arranged in the housing 1 is rotatably driven by the mechanical drive 2 and thus used for separating seed. The separating device 3 is formed by a rotary plate 6 and a perforated disk 7 comprising circularly arranged perforations 7A and is thus designed as a hollow drum comprising two spaced-apart side walls. A pneumatic single-grain sowing machine (not shown) is equipped with a plurality of such housings 1, namely with at least one housing 1 per row.

The seed to be separated is fed to the housing 1 via the seed feed 4 from a seed storage container (not shown). Furthermore, the housing comprises an air nozzle 5 on the stationary housing part 1S for the connection of a fan, which is also not shown, and can thus be subjected to a pressure difference. As the separating device 3 is designed as a closed hollow drum and the interior of the separating device 3 is in communication with the atmosphere via a housing opening 1A in the cover 10, the pressure difference drops via the perforated disk 7, more precisely at the circularly arranged perforations 7A. Accordingly, the pressure difference is used to ensure that the seed to be separated accumulates at the perforations 7A of the perforated disk 7 and is thus separated. In order to detach the seed from the perforated disk 7 and to feed it to a dispensing line 8, a hole covering element 11 is arranged inside the separating device 3. The hole covering element 11 rotates about its own central axis and thus rolls on the perforations 7A of the perforated disk 7. In this way the pressure difference is interrupted once per revolution of the perforated disk 7, which causes the seed to be detached and accelerated in the dispensing line 8 by the pressure difference generated by the fan.

The hole covering element 11 is arranged on a support arm 12, which is rigidly connected to the cover 1D. Since the hole covering element 11 is shaped in such a way that it rolls with its entire outer surface on the perforated disk 7, different path speeds occur over the height of the hole covering element 11, which are proportional to the rolling radius on the perforated disk 7. In order to compensate for these different speeds and thus prevent increased wear of the hole covering element 11, the hole covering element 11 is arranged at an angle to the perforated disk 7. The central axis of the hole covering element 11 encloses an angle of more than 5 degrees with the perforated disk 7, so that the path speeds can be adjusted in an optimal way.

To drive the separating device 3, a drive shaft 9 is guided from the mechanical drive 2 into the housing 1, as shown in FIG. 2. The drive shaft is supported in the stationary housing part 1S and at its front end the drive shaft 9 penetrates the perforated disk 7. The perforated disk 7 is connected to the drive shaft 9 by means of a screw connection and is sealed against the drive shaft 9 by means of a sealing element. Thus, the separating device 3 can be driven without negative influence on the pressure difference between housing 1 and the interior of the separating device 3.

Furthermore, the separating device 3 between the rotary plate 6 and the perforated disk 7 is designed to be divisible by a dividing plane which is substantially perpendicular to the drive shaft 9. In the undivided state of the separating device 3, as shown in FIG. 2, the dividing plane is closed airtight by a seal 10 running around the rotary plate 6. For this purpose, the seal 10 is made of an elastic sealing material and extends from the rotary plate 6, which is arranged in the cover 1D by means of a bearing, in the direction of the perforated disk 7 with sufficient oversize so that the seal 10 rests against the perforated disk 7. On the one hand this ensures that the separating device 3 is sealed and on the other hand the seal 10 also functions as a frictional coupling between the rotary plate 6 and the perforated disk 7. In a simple manner the rotary motion of the perforated disk 7, which is driven by the mechanical drive 2 with its drive shaft 9, is transferred to the rotary plate 6. The separating device 3 can be easily separated by removing the cover 10 of the housing 1.

Due to the sufficiently large oversize of the seal 10 in the axial direction of the separating device 3, as described above, the seal 10 is configured to seal a distance of up to 50 mm between the rotary plate 6 and the perforated disk 7. Preferably, the seal 10 is at least configured to seal a distance of 0 to 40 mm, particularly preferably 0 to 30 mm in the axial direction of the separating device 3 between the rotary plate 6 and the perforated disk 7.

Since the seal 10 is configured to compensate for distances, this minimizes the risk that manufacturing tolerances from the rotary plate 6 arranged in the cover 10 and the perforated disk 7 or drive shaft 9 arranged in the stationary housing part 1S add up in a negative way.

A further possibility of compensating for manufacturing tolerances, installation-related clearance and further distances is provided by the fact that the distance of the perforated disk 7 to the stationary housing part 1S is adjustable. In addition, the distance between the perforated disk 7 and the dispensing line 8 can be adjusted at the same time to improve the supply of the separated seed. For this purpose, the drive shaft 9 is designed with an external thread 9G at its front end. The external thread 9G corresponds with an internal thread 7G in the perforated disk 7, so that the perforated disk 7 is variably arranged in axial direction on the drive shaft 9 over the length of the thread 9G, and thus the distance to the stationary housing part 1S is adjustable. To prevent the perforated disk 7 from rotating when driving the drive shaft 9, the front end of the drive shaft 9 is further provided with an anti-rotation device. The anti-rotation device comprises an elongated recess in the drive shaft 9, recesses in the perforated disk 7 and a cooperating securing element. The securing element is fixed to the drive shaft 9 by a screw and the elongated recess and prevents a rotational movement of the perforated disk 7 by engaging one of the recesses in it. Consequently, the anti-rotation device must be released for adjusting the distance of the perforated disk 7 to the stationary part of the housing 1S.

A second embodiment of the invention is shown in FIGS. 3 and 4. In this embodiment, the housing 1 comprises an electric drive 13. The housing 1 is otherwise identically designed as described above in the embodiment with the mechanical drive 2. The mechanical drive 2 can thus be replaced by the electric drive 13 without making any changes to the housing 1. As can be seen in FIG. 4, the drive shaft 9' of the electric drive 13 in the second embodiment also comprises an external thread 9G at its front end and corresponding means for securing the perforated disk 7 against rotation. In this embodiment, the perforated disk 7 is also supported in the stationary housing part 1S via the drive shaft 9'. The electric drive 13 is inserted into the housing 1 instead of the drive shaft 9 of the mechanical drive 2 and is connected to an electric power source via cables not shown further.

In summary, both embodiments of the invention described above have different means for compensating for the slight expansion of the housing 1 under pressure.

LIST OF REFERENCE NUMERALS 1 housing
1S stationary housing part
1D removable cover
1A housing opening
2 mechanical drive
3 separating device
4 seed feed
5 air nozzle
6 rotary plate
7 perforated disk
7A perforation
7G internal thread
8 dispensing line
9, 9' drive shaft
9G external thread
10 seal
11 hole covering element
12 support arm

The invention claimed is:

1. A pneumatic single-grain sowing machine, comprising:
at least one closed housing having a seed storage container, and
at least one rotatably driven separating device, which has circularly arranged perforations, and a fan for producing a pressure difference between the housing and an interior of the separating device,
wherein the separating device is configured to separate seed by use of the perforations and the pressure difference,
wherein the separated seed is configured to be detached from the perforations by interruption of the pressure difference by a hole covering element, so that the detached, separated seed is fed to a dispensing line,
wherein the separating device is designed as a closed hollow drum having two side walls arranged at a distance from each other, the perforations are arranged in at least one of said side walls,
wherein a drive shaft is guided through at least one of said side walls, the hollow drum is sealed against the drive shaft by a sealing element, the hollow drum is designed to be divisible by a dividing plane, the hollow drum is formed by a rotary plate and a perforated disk having the perforations, the dividing plane lies between the rotary plate and the perforated disk and is sealed by a seal in the undivided state, and after the interruption of the pressure difference, the separated seed is accelerated by an additional pressure difference in the dispensing line, and
wherein a front end of the drive shaft comprises an external thread corresponding with an internal thread formed in the perforated disk, the perforated disk with the internal thread being variably arranged in an axial direction on the drive shaft over the length of the external thread for adjusting a distance between the perforated disk and a stationary part of the housing.

2. The pneumatic single-grain sowing machine according to claim 1, wherein the housing is formed by a stationary housing part and a removable cover, the rotary plate is supported in the cover by a bearing, the drive shaft is supported in the stationary housing part by another bearing, and the drive shaft is guided through the perforated disk so as to drive the perforated disk.

3. The pneumatic single-grain sowing machine according to claim 2, wherein the hollow drum is separated by removing the cover.

4. The pneumatic single-grain sowing machine according to claim 1, wherein the distance between the perforated disk and the stationary part of the housing is adjustable between approximately 0 and 6 mm.

5. The pneumatic single-grain sowing machine according to claim 1, wherein the seal is arranged on the rotary plate and the seal forms a frictional coupling between the rotary plate and the perforated disk.

6. The pneumatic single-grain sowing machine according to claim 1, wherein the seal is configured to seal a gap between rotary plate and perforated disk in an axial direction of the hollow drum.

7. The pneumatic single-grain sowing machine according to claim 1, wherein the housing comprises a drive which is configured to drive the drive shaft, the drive is operated electrically or mechanically, and an electric drive and a mechanical drive are interchangeable with one another.

8. The pneumatic single-grain sowing machine according to claim 1, wherein the hole covering element rolls on the perforations of the perforated disk so as to rotate about its own central axis, the hole covering element is supported in a stationary, rotatable manner by a support arm rigidly connected to a cover, and the central axis of the hole covering element encloses an angle of more than 5 degrees with the perforated disk.

\* \* \* \* \*